US011918118B2

(12) United States Patent
Smidel

(10) Patent No.: US 11,918,118 B2
(45) **Date of Patent: *Mar. 5, 2024**

(54) KNEE CUSHIONS

(71) Applicant: James J Smidel, Kewaunee, WI (US)

(72) Inventor: James J Smidel, Kewaunee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,208

(22) Filed: Oct. 18, 2022

(65) Prior Publication Data

US 2023/0039258 A1 Feb. 9, 2023

Related U.S. Application Data

(63) Continuation of application No. 17/238,481, filed on Apr. 23, 2021, now Pat. No. 11,497,318.

(51) Int. Cl.
*A47C 20/02* (2006.01)
*A47C 20/00* (2006.01)
(Continued)

(52) U.S. Cl.
CPC .............. *A47C 20/021* (2013.01); *A47G 9/10* (2013.01); *A61G 7/0755* (2013.01); *A47C 20/02* (2013.01);
(Continued)

(58) Field of Classification Search
CPC ........ A47C 20/021; A47C 20/02; A47G 9/10; A47G 2009/1018; A61G 13/1245; A61G 7/0755; A61G 7/075; A61G 7/1096
(Continued)

(56) References Cited

U.S. PATENT DOCUMENTS 3,124,812 A * 3/1964 Milton et al. ............ A47G 9/10 5/636
3,604,023 A * 9/1971 Lynch .................. A61B 6/0442 D6/601

(Continued)

FOREIGN PATENT DOCUMENTS

| | | |
|---|---|---|
| CA | 3057936 | 4/2020 |
| WO | WO-0112021 | 2/2001 |
| WO | WO-2004-062442 | 7/2004 |

OTHER PUBLICATIONS

Gentle Living Store, Gentle Living Leg Elevation Foam Pillow for Injury, Surgery and Rest—Improves Circulation—Removal and Washable Cover.

(Continued)

*Primary Examiner* — Robert G Santos
(74) *Attorney, Agent, or Firm* — Amundsen Davis, LLC

(57) ABSTRACT

A knee cushion is disclosed which includes an integral foam member having a first major surface, an oppositely aligned second major surface, at least one side wall joining the first major surface to the second major surface. Leg depressions are formed in both the first and second major surfaces. The leg depressions are arranged in the shape of a modified peace symbol. The leg depressions permit a person to position the knee cushion between their knees while sleeping on their side to assist in aligning their hips and for keeping their spine straight. The integral foam member also includes a circular depression located in a central portion of the modified peace symbol on both the first and second major surfaces. Lastly the integral foam member has an Indentation Force Deflection at 25% of from between about 8 pounds-force to about 18 pounds-force.

20 Claims, 4 Drawing Sheets

(51) Int. Cl.
*A47G 9/10* (2006.01)
*A61G 7/075* (2006.01)

(52) U.S. Cl.
CPC ...... *A47G 2009/1018* (2013.01); *A61G 7/075* (2013.01)

(58) Field of Classification Search
USPC ............................................ 5/648, 624, 621
See application file for complete search history.

(56) References Cited

U.S. PATENT DOCUMENTS

| | | | | |
|---|---|---|---|---|
| 3,931,654 A * | 1/1976 | Spann | A61F 5/3761 | 5/650 |
| 4,177,806 A * | 12/1979 | Griffin | A61F 13/062 | 128/892 |
| 4,584,730 A * | 4/1986 | Rajan | A47C 20/027 | 5/632 |
| 4,688,285 A * | 8/1987 | Roberts | A61G 7/05723 | 5/630 |
| 4,736,477 A * | 4/1988 | Moore | A47C 20/021 | 128/892 |
| 4,910,818 A | 3/1990 | Grabill et al. | | |
| D319,751 S * | 9/1991 | Hoff | D6/601 | |
| 5,117,522 A * | 6/1992 | Everett | A61G 7/0755 | 5/644 |
| 5,125,123 A | 6/1992 | Engle | | |
| 5,216,771 A * | 6/1993 | Hoff | A47C 20/025 | 5/652 |
| 5,418,991 A * | 5/1995 | Shiflett | A61F 5/01 | 5/648 |
| 5,664,271 A * | 9/1997 | Bellavance | A47C 20/021 | 5/652 |
| 5,746,218 A * | 5/1998 | Edge | A47C 20/021 | 128/DIG. 20 |
| 5,878,453 A | 3/1999 | Stokes | | |
| 6,145,508 A * | 11/2000 | Seip, Jr. | A47C 20/021 | 128/845 |
| 6,154,905 A * | 12/2000 | Frydman | A47C 20/021 | 606/240 |
| 6,182,311 B1 * | 2/2001 | Buchanan | A47C 20/021 | 128/845 |
| 6,182,314 B1 * | 2/2001 | Frydman | A47C 20/021 | 606/240 |
| 6,438,779 B1 * | 8/2002 | Brown | A47C 20/021 | 5/915 |
| 6,578,218 B2 | 6/2003 | Wassilefsky | | |
| 6,640,368 B2 | 11/2003 | Roston | | |
| 6,807,697 B2 | 9/2004 | Druery | | |
| 6,954,953 B2 | 10/2005 | Bordan | | |
| 6,966,088 B1 * | 11/2005 | Hu | A61G 7/05784 | 5/944 |
| 7,316,041 B2 * | 1/2008 | Guez | A47G 9/10 | 5/636 |
| 7,516,504 B2 * | 4/2009 | Guez | A47G 9/10 | 5/636 |
| 9,603,458 B2 | 3/2017 | Pelletier | | |
| 10,143,311 B2 | 12/2018 | Pelletier | | |
| 11,317,728 B2 | 5/2022 | Rogers | | |
| 11,497,318 B1 * | 11/2022 | Smidel | A47G 9/10 | |
| 11,712,120 B2 * | 8/2023 | Burwick | A47C 20/021 | 5/648 |
| 2001/0027577 A1 * | 10/2001 | Frydman | A47C 20/021 | 5/648 |
| 2002/0088057 A1 * | 7/2002 | Wassilefsky | A61G 7/0755 | 5/648 |
| 2003/0005521 A1 | 1/2003 | Sramek | | |
| 2003/0046767 A1 | 3/2003 | Roston | | |
| 2004/0172761 A1 | 9/2004 | Druery | | |
| 2005/0000021 A1 | 1/2005 | Bordan | | |
| 2007/0006382 A1 * | 1/2007 | Guez | A47G 9/10 | 5/636 |
| 2008/0092296 A1 * | 4/2008 | Guez | A47G 9/10 | 5/636 |
| 2008/0092297 A1 | 4/2008 | Davis | | |
| 2016/0100694 A1 | 4/2016 | Pelletier | | |
| 2017/0258238 A1 | 9/2017 | Pelletier | | |
| 2020/0107644 A1 | 4/2020 | Dubois | | |
| 2020/0221880 A1 | 7/2020 | Rogers | | |
| 2022/0240685 A1 * | 8/2022 | Burwick | A61G 7/0755 | |
| 2022/0338639 A1 * | 10/2022 | Smidel | A47C 20/021 | |
| 2023/0039258 A1 * | 2/2023 | Smidel | A61G 7/0755 | |

OTHER PUBLICATIONS https://www.amazon.com/Elevation-Memory-Pillow-Injury=Surger/dp/B07PP59SC4/ref=sr_1_191?dchild=1&keywords+Knee+Wedge&gid=1615821792&sr=8-191.

* cited by examiner

KNEE CUSHIONS

CROSS REFERENCE TO RELATED APPLICATIONS

This is a continuation of U.S. Ser. No. 17/238,481, "A Knee Cushion", filed Apr. 23, 2021 and now, the contents of which are incorporated herein by reference.

FIELD OF THE INVENTION

The present invention relates to a knee cushion which can be placed between the knees of a person resting or sleeping on their side to provide support and reduces pressure points so that the person can obtain a more comfortable and relaxing rest or sleep.

BACKGROUND OF THE INVENTION

Cushions, pillows, and other uniquely formed structures have been used for some time by people who rest or sleep on their sides, in the hope of minimizing pressure points, for aligning their hips, and to keep their spine straight so that they can obtain a more comfortable rest or sleep. Some cushions have an elongated shape and are of such a length that they are utilized along a portion of the legs, knees and/or thighs of a user. Other devices are designed to be placed between the knees of a person and generally have a 3-D configuration with a tapered or raised surface to keep the person's knees bent. Still other devices employ raised profiles to keep a person's knees and/or legs elevated. Some use a biased member to keep the knees separated from one another. Still other devices use restraining straps to keep the device positioned between a person's knees as they roll or move from side to side during a night's sleep.

It has been found that many of these devices are lacking in some aspect and a more comfortable knee cushion is needed to provide a comfortable rest or sleep for a person who sleeps on their side.

Now, a knee cushion has been invented which can be placed between the knees of a person who rest or sleep on their side. The knee cushion has first and second, oppositely aligned major surfaces which receive the person's knees and a small portion of their adjacent legs and thereby reduces pressure points so that the person can obtain a more comfortable and relaxing rest or sleep. The knee cushion also assists in aligning the person's hips, keeping their spine straight and keeping their knee bones from touching.

SUMMARY OF THE PRESENT INVENTION

Briefly, this invention relates to a knee cushion for placement between the knees of a person while they rest or sleep on their side, to assist in aligning their hips and for keeping their spine straight. The knee cushion includes an integral foam member having a first major surface, an oppositely aligned second major surface, at least one side wall joining the first major surface to the second major surface, and an outer periphery. The knee cushion has leg depressions formed in both the first and second major surfaces. The leg depressions are arranged in the shape of a modified peace symbol, and each leg depression has a bottom surface. The bottom surfaces can have upwardly extending raised areas to increase air flow. The leg depressions permit a person to position the knee cushion between their knees and to orient their legs in at least two different positions. The knee cushion will assist in aligning their hips, keeping their spine straight, prevent their knee bones from touching, and provide room for a man's testicles, so as to obtain a more comfortable and relaxing sleep. The knee cushion has a circular depression located in a central portion of the modified peace symbol on both the first and second major surfaces. Each of the circular depressions has a diameter of greater than about 1 inch. The circular depressions align with a person's knees. Lastly, the integral foam member has an Indentation Force Deflection at 25% of from between about 8 pounds-force to about 18 pounds-force.

In another embodiment, the knee cushion is designed to be positioned between the knees of a person while they rest or sleep on their side, to assist in aligning their hips and for keeping their spine straight. The knee cushion includes an integral foam member having a first major surface, an oppositely aligned second major surface, at least one side wall joining the first major surface to the second major surface, and an outer periphery. The knee cushion also has leg depressions formed in both the first and second major surfaces. The leg depressions are arranged in the shape of a modified peace symbol, and each leg depression has a bottom surface. The bottom surfaces can have upwardly extending raised areas to increase air flow. The leg depressions permit a person to position the knee cushion between their knees, in at least two different positions. The person's legs can extend in a straight line or their legs can be bent at the knees. The knee cushion also has a circular depression located in a central portion of the modified peace symbol on both the first and second major surfaces. Each of the circular depressions has a diameter of greater than about 1.5 inches. The circular depressions align with a person's knees. Lastly, the integral foam member is formed from polyurethane and has a percent elongation ranging from between about 170% to about 180% and has an Indentation Force Deflection at 25% of from between about 9 pounds-force to about 17 pounds-force.

In a third embodiment, the knee cushion is designed to be placed or positioned between the knees of a person while they rest or sleep on their side, to assist in aligning their hips and for keeping their spine straight. The knee cushion includes an integral foam member having a circular profile with a diameter ranging from between about 6 inches to about 18 inches. The integral foam member has a first major surface, an oppositely aligned second major surface, and at least one side wall joining the first major surface to the second major surface. The at least one sidewall has a height ranging from between about 2.5 inches to about 6 inches. The integral foam member also has an outer periphery. The knee cushion also has leg depressions formed in both the first and second major surfaces. The leg depressions are arranged in the shape of a modified peace symbol, and each leg depression has a bottom surface and a pair of sidewalls which tapers downward to the bottom surface. The bottom surfaces can have upwardly extending raised areas to increase air flow. The leg depressions permit a person to position the knee cushion between their knees, in at least two different positions. The legs can extend in a straight line or the legs can be bent at the knees. The knee cushion also has a circular depression located in a central portion of the modified peace symbol on both the first and second major surfaces. Each of the circular depressions has a diameter of at least about 1.75 inches. The circular depressions align with a person's knees. Lastly, the integral foam member is formed from polyurethane and has a percent elongation ranging from between about 170% to about 180%, has an Indentation Force Deflection at 25% of from between about 10 pounds-force to about 16 pounds-force, has a tensile strength ranging from between about 7 pounds per square inch (psi) to about 10 psi, and has a tear strength of from between about 1.55 pounds per linear inch (pli) to about 1.7 pli.

The general object of this invention is to provide a knee cushion which can be placed between the knees of a person resting or sleeping on their side, align their hips, keep their spine straight, prevent the knee bones from touching, reduces pressure points, and provide room for a man's testicles so that the person can obtain a more comfortable and relaxing rest or sleep. A more specific object of this invention is to provide a knee cushion which can be either placed between the knees of a person resting or sleeping on their side or be placed under one knee.

Another object of this invention is to provide a knee cushion which can be placed between the knees of a person resting or sleeping on their side, and which contains leg depressions arranged as a modified peace symbol so that the person can position their knees in a straight line or at an angle to obtain a more relaxing rest or sleep.

Still another object of this invention is to provide a knee cushion which reduces the number of pressure points against a person's legs and knees and allows for a comfortable night's rest.

Still further, an object of this invention is to provide a knee cushion which is relatively easy to manufacture and can be sold at a reasonable priced.

Other objects and advantages of the present invention will become more apparent to those skilled in the art in view of the following description and the accompanying drawings.

DETAILED DESCRIPTIONS OF THE INVENTION

Figure 1:
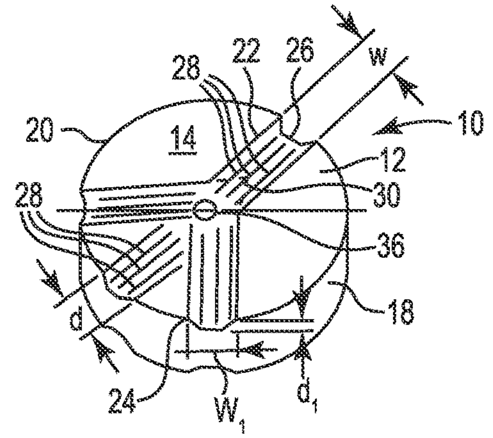
FIG. 1 is a perspective view of a knee cushion.

Referring to FIGS. 1-6, a knee cushion 10 is shown which can be placed or be positioned between the knees of a person resting or sleeping on their side and will provide comfort and reduces pressure points so that the person can obtain a more comfortable and relaxing rest or sleep. The knee cushion 10 is formed or constructed of an integral foam member 12 that is resiliently compressible and capable of retaining its shape upon removal of the compression forces applied by a user. By "integral" it is meant a complete unit; a whole. The knee cushion 10, and thus the integral foam member 12, has a first major surface 14, an oppositely aligned second major surface 16, at least one side wall 18 joining the first major surface 14 to the second major surface 16, and an outer periphery 20. By "periphery" it is meant a line that forms the boundary of an area.

Referring to FIGS. 2-6, the knee cushion 10 has a longitudinal central axis X-, a vertical central axis Y-, and a transverse central axis Z-.

The knee cushion 10 can be formed from a variety of resilient foam or compressible materials known to one skilled in the art. Such foams and other compressible materials, as well as the chemicals and starting compositions needed to mold such foams, are commercially available from various vendors. Foam Supplies, Inc. having an office at 13389 Lakefront Drive, Earth City, MO 63045 is one such vendor. The integral foam member 12 used to form or construct the knee cushion 10 can consist of various kinds of foams. These include, but are not limited to: polyurethane, high performance polyurethane, soft polyurethane, flexible polyurethane, a polyurethane memory foam, a polyurethane antimicrobial foam, polyethylene, a soft polyethylene, a polyethylene memory foam, a polyethylene antimicrobial foam, as well as other foam known to those skilled in the art. The integral foam member 12 can be an open cell foam, a closed cell foam, be a combination of open and closed cell foams, etc. Polyurethane foams are the most desirous for constructing the knee cushion 10. A "memory foam" is one which can retain a "memory" of its original shape.

Polyurethanes are one of the most versatile plastic materials. The nature of the chemistry allows polyurethanes to be adapted to solve challenging problems, to be molded into unusual shapes and to enhance industrial and consumer products by adding comfort, warmth, and convenience to our lives. Polyurethanes are formed by reacting a polyol (an alcohol with more than two reactive hydroxyl groups per molecule) with a diisocyanate or a polymeric isocyanate in the presence of suitable catalysts and additives. Because a variety of diisocyanatos and a wide range of polyols can be used to produce polyurethane, a broad spectrum of materials can be produced to meet the needs of specific applications.

Flexible polyurethane foam (FPF) is used as cushioning for a wide variety of consumer and commercial products, including furniture, carpet cushion, transportation, bedding, packaging, textiles, and fibers. Polyurethane foam provides the following benefits: support and comfort, durability, resiliency, energy absorption, and handling strength. Flexible polyurethane foam (FPF) also provides thermal insulation, tear resistance, fire resistance and light weight.

Foam Supplies, Inc. also supplies molded, slabstock, integral skin, viscoelastic polyurethane foam systems, and pour-in-place polyurethane foam systems which provide superior thermal performance, robust processing characteristics and excellent finished properties for efficient manufacturing and high performance across a wide range of applications.

A desired polyurethane foam that can be used to form the knee cushion 10 is ECOFLEX® available from Foam Supplies, Inc. ECOFLEX® VEM 1001 ECOMATE® is a soft polyurethane memory foam. ECOMATE® is an Environmental Protection Agency snap approved foam exhibiting no Global Warming Potential, no Ozone Depletion Potential and no Volatile Organic Compounds. This foam is a lightweight memory foam with about 2 to about 4 seconds recovery time. It is made by mixing a 2.17 to 1 ratio of polymer to isocyanates. The composition is mixed from between about 13 to about 15 seconds at a temperature of 80° F. (Fahrenheit) and can then be poured or injected into a two-piece mold. This mold can be made from various materials known to those skilled in the art. Some such materials include, but are not limited to: silicon rubber, aluminum, cast iron, steel, metal alloys, etc. The process could also be done on a 3D printer developed to produce a foam material. 3D printing is described in a Materials and design report 179(2019) 107905 available at https://doi.org/10.1016/j.matdes.2019.107905 which is incorporated by reference and made a part hereof. The polyurethane foam used to construct the knee cushion 10 can be colored or died, if desired. The foam can be died any color by adding one or more drops of "SO-strong" brand urethane color system dies available from Smooth-On Inc. having an office at 560 Lower Macungie Road, Macungie, PA 18062. Alternatively, the knee cushion 10 could be colored in some other manner known to those skilled in the art. Standard color options include, but are not limited to: black, brown, purple, blue, green, yellow, red, flesh, or white. The knee cushion 10 could contain a single color or could exhibit two or more distinct colors. The knee cushion 10 could be multi-colored, if desired.

The knee cushion 10 can vary in size, weight, and configuration. The knee cushion can have a round or circular configuration. Alternatively, the knee cushion 10 could have almost any geometrical shape, including but not limited to: a square, a rectangular, a triangle, a polygon, a pentagon, a hexagon, or an octagon. The knee cushion 10 could also be formed or constructed to have an irregular shape. A round configuration is the most desired. A round knee cushion 10 can have a diameter which ranges from between about 6 inches to about 18 inches or more. Since the knee cushion 10 can be formed or constructed to have almost any desired size, a round or circular knee cushion 12 could have a diameter of 6 inches, 7 inches, 8 inches, 9 inches, 10 inches, 11 inches, 12 inches, 13 inches, 14 inches, 15 inches, 16 inches, 17 inches, or 18 inches, or any dimension therebetween. The knee cushion 10 can have a diameter of more than 18 inches, to accommodate a larger person, if needed.

The knee cushion 10 could vary in weight. For a round knee cushion, as shown in FIGS. 1-6, having a diameter of from about 12 to about 18 inches and a height of 4 inches or less, the weight of the knee cushion 10 could range from between about 0.5 to about 2.5 pounds. Desirably, for a round knee cushion having a diameter of from between about 12 to about 18 inches and a height of about 4 inches or less, the weight of the knee cushion 10 could range from between about 0.8 to about 2 pounds. More desirably, for a round knee cushion having a diameter of from between about 12 to about 18 inches and a height of about 4 inches or less, the weight of the knee cushion 10 could range from between about 0.9 to about 1.8 pounds. Even more desirably, for a round knee cushion having a diameter of from between about 12 to about 18 inches and a height of about 4 inches or less, the weight of the knee cushion 10 could range from between about 1 to about 1.7 pounds. Most desirably, for a round knee cushion having a diameter of from between about 12 to about 18 inches and a height of about 4 inches or less, the weight of the knee cushion 10 should be less than about 1.7 pounds.

The knee cushion 10 can also vary in height h. By "height" it is meant the dimension measured between the first major surface 14 and the second major surface 16. The height h of the sidewall 18 will determine the height h of the knee cushion 10. The height h of the sidewall 18 will be the same as the height h of the knee cushion 10. The height h of the knee cushion 10 could range from between about 2 inches to about 8 inches. Desirably, the height h of the knee cushion 10 could range from between about 2.3 inches to about 6 inches. More desirably, the height h of the knee cushion 10 could range from between about 2.5 inches to about 5.5 inches. Even more desirably, the height h of the knee cushion 10 could range from between about 2.75 inches to about 5 inches. Still more desirably, the height h of the knee cushion 10 could range from between about 3 inches to about 4.5 inches. Most desirably, the height h of the knee cushion 10 could be less than about 4 inches.

The knee cushion 10, in its finished form should have a specific coefficient of friction. Coefficient of Friction (COF) is a numerical value describing the resistance an object will be under as it tries to slide across a surface. It is the ratio of the force required to slide it along a flat surface to the normal force on the object. If there are other vertical forces acting on the object, the normal force will not equal the object's weight. In equation form, this is $\mu=F_s/N$. The COF of a polyurethane foam is similar to that of soft rubber. Softer polyurethane foams have a higher COF value than harder polyurethane foams. Typical COF values for polyurethane foams ranges from between about 0.2 to about 2.5. The knee cushion 10 is soft and possesses a sticky feel which creates a COF closer to the higher end of this COF range.

The knee cushion 10 can have a COF which ranges from between about 0.2 to about 2.5. Desirably, the knee cushion 10 will have a COF which ranges from between about 0.5 to about 2.5. More desirably, the knee cushion 10 will have a COF which ranges from between about 1.0 to about 2.5. Even more desirably, the knee cushion 10 will have a COF which ranges from between about 1.5 to about 2.5. Still more desirably, the knee cushion 10 will have a COF which ranges from between about 2.0 to about 2.5. Most desirably, the knee cushion 10 will have a COF which ranges from between about 2.25 to about 2.5. Constructing a knee cushion 10 with a COF value closer to 2.5 is beneficial when the integral foam member 12 is enclosed by a cloth cover, for the higher COF will assist in keeping the cover in place.

Still referring to FIGS. 1-6, the integral foam member 12 used to form or construct the knee cushion 10 should have a specific density. By "density" it is meant the quality or condition of being dense; the quantity of something per unit measure, especially per unit length, area, or volume. The integral foam member 12 selected to construct the knee cushion 10 should have a density ranging from between about 1.5 pounds per cubic foot (pcf) to about 3 pcf. Desirably, the integral foam member 12 selected to construct the knee cushion 10 should have a density ranging from between about 1.8 pcf to about 2.8 pcf. More desirably, the integral foam member 12 selected to construct the knee cushion 10 should have a density ranging from between about 1.9 pcf to about 2.7 pcf. Even more desirably, the integral foam member 12 selected to construct the knee cushion 10 should have a density ranging from between about 2 pcf to about 2.6 pcf. Most desirably, the integral foam member 12 selected to construct the knee cushion 10 should have a density of less than about 2.5 pcf.

The integral foam member 12 selected to construct the knee cushion 10 should also have a specific tensile strength. By "tensile strength" it is meant the maximum tension a material can withstand without tearing. The integral foam member 12 selected to construct the knee cushion 10 should have a tensile strength ranging from between about 7 pounds per square inch (psi) to about 10 psi. Desirably, the integral foam member 12 selected to construct the knee cushion 10 should have a tensile strength ranging from between about 7.5 psi to about 9 psi. More desirably, the integral foam member 12 selected to construct the knee cushion 10 should have a tensile strength ranging from between about 7.7 psi to about 8.5 psi. Even more desirably, the integral foam member 12 selected to construct the knee cushion 10 should have a tensile strength ranging from between about 7.8 psi to about 8.2 psi. Most desirably, the integral foam member 12 selected to construct the knee cushion 10 should have a tensile strength of about 8 psi.

The integral foam member 12 selected to construct the knee cushion 10 should further have a specific tear strength. By "tear strength" it is meant the amount of force needed to rip a particular sampling subject and to continue through it in a vertical axis. The tear strength is calculated by force (in Newtons) divided by thickness (in millimeters, centimeters, inches, etc.). Tear strength is equal to F/t. Desirably, the integral foam member 12 selected to construct the knee cushion 10 has a tear strength ranging from between about 1.5 pounds per linear inch (pli) to about 1.9 pli. More desirably, the integral foam member 12 selected to construct the knee cushion 10 should have a tear strength ranging from between about 1.6 pounds per linear inch (PLI) to about 1.8 pli. Even more desirably, the integral foam member 12 selected to construct the knee cushion 10 should have a tear strength ranging from between about 1.55 pounds per linear inch (PLI) to about 1.7 pli. Most desirably, the integral foam member 12 selected to construct the knee cushion 10 should have a tear strength of about 1.6 pli.

The integral foam member 12 selected to construct the knee cushion 10 should also have a specific percent elongation. By "percent elongation" it is meant a measurement that captures the amount a material will plastically and elastically deform up to fracture. Percent elongation is one way to measure and quantify the ductility of a material. The material's final length is compared with its original length to determine the percent elongation and the material's ductility. The integral foam member 12 selected to construct the knee cushion 10 has a percent elongation of at least about 150 percent (%). Desirably, the integral foam member 12 selected to construct the knee cushion 10 should have a percent elongation ranging from between about 160% to about 190%. More desirably, the integral foam member 12 selected to construct the knee cushion 10 should have a percent elongation ranging from between about 165% to about 185%. Even more desirably, the integral foam member 12 selected to construct the knee cushion 10 should have a percent elongation ranging from between about 170% to about 180%. Most desirably, the integral foam member 12 selected to construct the knee cushion 10 should have a percent elongation of about 175%.

The integral foam member 12 selected to construct the knee cushion 10 should have a specific Compression Set. By "Compression Set" it is meant the permanent deformation of a material remaining after removal of a force that was applied to it, using compression set ASTM D395 (ASTM stands for the "American Society for Testing and Materials"). The term is normally applied to soft materials such as elastomers and foam. Compression is normally measured in two ways: compression set A and compression set B. Compression set A is the test we will use. Compression set A (CA) is the formal name of a compression set under constant force in air. In compression set A, a force of 1.8 kilonewtons (kN) is applied to the specimen for a set time at a set temperature. A kilonewton (kN) is a SI-multiple of the force unit Newton and is equal to one thousand Newtons (1,000 N). Compression set A (CA) is defined as the percentage of the original specimen thickness after the specimen has been left in normal conditions for 30 minutes. CA, the compression set A is given by CA=[(to−ti)/to]*100 where "to" is the original specimen thickness, and "ti" is the specimen's thickness after testing. The integral foam member 12 selected to construct the knee cushion 10 should have a Compression Set A, tested at 50% of at least about 2.5%, which means that after 22 hours of being compressed at 50%, the integral foam member 12 recovered to 97.5%. Desirably, the integral foam member 12 selected to construct the knee cushion 10 should have a Compression Set A, tested at 50% of at least about 2.0%, which means that after 22 hours of being compressed at 50%, the integral foam member 12 recovered to 98%. More desirably, the integral foam member 12 selected to construct the knee cushion 10 should have a Compression Set A, tested at 50% of at least about 1.8%, which means that after 22 hours of being compressed at 50%, the integral foam member 12 recovered to 98.2%. Even more desirably, the integral foam member 12 selected to construct the knee cushion 10 should have a Compression Set A, tested at 50% of at least about 1.5%, which means that after 22 hours of being compressed at 50%, the integral foam member 12 recovered to 98.5%. Most desirably, the integral foam member 12 selected to construct the knee cushion 10 should have a Compression Set A, tested at 50% of at least about 1.3%, which means that after 22 hours of being compressed at 50%, the integral foam member 12 recovered to 98.7%.

The integral foam member 12 selected to construct the knee cushion 10 should also have a specific Indentation Force Deflection (IFD). By "Indentation Force Deflection (IFD)" it is meant a process in the flexible foam manufacturing industry to assess the "softness" of a sample of foam, such as memory foam. To conduct an IFD test, a circular flat indenter with a surface area of 323 square centimeters (50 sq. inches-8" in diameter) is pressed against a foam sample usually 100 mm thick and with an area of 500 mm by 500 mm (ASTM standard D3574). The foam sample is first placed on a flat table perforated with holes to allow the passage of air. It is then "warmed up" by being compressed twice to 75% "strain", and then allowed to recover for six minutes. The force is measured 60 seconds after achieving 25% indentation with the indenter. The force can also be measured 60 seconds after achieving 65% indentation with the indenter. Lower scores correspond with less firmness and higher scores with greater firmness. US measurements are given in pounds-force, and European ones are given in Newtons.

The integral foam member 12 selected to construct the knee cushion 10 should have an Indentation Force Deflection at 25% which ranges from between about 8 pounds-force to about 18 pounds-force. Desirably, the integral foam member 12 selected to construct the knee cushion 10 should have an Indentation Force Deflection at 25% which ranges from between about 9 pounds-force to about 17 pounds-force. More desirably, the integral foam member 12 selected to construct the knee cushion 10 should have an Indentation Force Deflection at 25% which ranges from between about 10 pounds-force to about 16 pounds-force. Still more desirably, the integral foam member 12 selected to construct the knee cushion 10 should have an Indentation Force Deflection at 25% which ranges from between about 10 pounds-force to about 15 pounds-force. Even more desirably, the integral foam member 12 selected to construct the knee cushion 10 should have an Indentation Force Deflection at 25% which is less than about 15 pounds-force. Most desirably, the integral foam member 12 selected to construct the knee cushion 10 should have an Indentation Force Deflection at 25% of less than 13 pounds-force.

Furthermore, the integral foam member 12 selected to construct the knee cushion 10 should have an Indentation Force Deflection at 65% which ranges from between about 20 pounds-force to about 40 pounds-force. Desirably, the integral foam member 12 selected to construct the knee cushion 10 should have an Indentation Force Deflection at 65% which ranges from between about 30 pounds-force to about 38 pounds-force. More desirably, the integral foam member 12 selected to construct the knee cushion 10 should have an Indentation Force Deflection at 65% which ranges from between about 32 pounds-force to about 37 pounds-force. Even more desirably, the integral foam member 12 selected to construct the knee cushion 10 should have an Indentation Force Deflection at 65% which ranges from between about 34 pounds-force to about 36 pounds-force. Most desirably, the integral foam member 12 selected to construct the knee cushion 10 should have an Indentation Force Deflection at 65% of about 35 pounds-force.

The knee cushion 10 can be constructed to be hypoallergenic. By "hypoallergenic" it is meant "below average or slightly allergenic". The knee cushion 10 is believed to cause fewer allergenic reactions. The Food and Drug Administration (FDA) states on their website that: "There are no Federal standards or definitions that govern the use of the term "hypoallergenic". The term means whatever a particular company wants it to mean. People have varying degrees of sensitivity to allergy-causing ingredients (allergens). Some people might not be affected at all by a particular ingredient. Others might feel slightly itchy or uncomfortable. And there are those who might experience a full-fledged allergic reaction.

Referring again to FIGS. 1-6, the knee cushion 10 also includes a first leg depression 22 and a second leg depressions 24 formed in both of the first and second major surfaces, 14 and 16 respectively. The leg depressions 22, 22 and 24, 24 are arranged or oriented in the shape of a modified peace symbol. In the 1950's the "peace symbol" as it is known today, was designed by Gerald Holtom as the logo for the British Campaign for Nuclear Disarmament, a group at the forefront of the peace movement in the UK, and adopted by anti-war and counterculture activists in the US and elsewhere. The peace symbol is a super-imposition of the semaphore signals for the letters "N" and "D", taken to stand for "nuclear disarmament", while simultaneously acting as a reference to Goya's The Third of May 1808, (aka Peasant Before the Firing Squad").

Each of the first leg depressions 22, 22 is linear in configuration. By "linear" it is meant of, relating to, described by, or related to a straight line. Each of the first leg depressions 22, 22 also divides each of the first and second major surfaces, 14 and 16 respectively, in half. Each of the first leg depressions 22, 22 has a bottom surface 26. Each of the first leg depressions 22, 22 starts at a point on the outer periphery 20 and extends completely across each of the first and second major surfaces, 14 and 16 respectively, and terminates at a point located on the outer periphery 20 which is opposite to the starting point. Each of the first leg depression 22, 22 has a width w and a depth d. The width w and the depth d of each of the first leg depressions 22, 22 can vary. The width w of each of the first leg depressions 22, 22 can range from between about 2 inches to about 6 inches, depending on the overall size of the knee cushion 10. For a round knee cushion 10 having a diameter of from between about 12 to about 18 inches, the width w of each of the first leg depressions 22, 22 can range from between about 2.5 inches to about 5.75 inches. Desirably, for a round knee cushion 10 having a diameter of from between about 12 to about 18 inches, the width w of each of the first leg depressions 22, 22 can range from between about 2.75 inches to about 5.5 inches. More desirably, for a round knee cushion 10 having a diameter of from between about 12 to about 18 inches, the width w of each of the first leg depressions 22, 22 can range from between about 3 inches to about 5 inches. Even more desirably, for a round knee cushion 10 having a diameter of from between about 12 to about 18 inches, the width w of each of the first leg depressions 22, 22 can be at least about 3 inches. Most desirably, for a round knee cushion 10 having a diameter of from between about 12 to about 18 inches, the width w of each of the first leg depressions 22, 22 can be about 4 inches or less.

The depth d of each of the first leg depressions 22, 22 can range from between about 0.1 inch to about 1 inch, depending on the overall size of the knee cushion 10. The depth d is measured relative to one of the first or second major surfaces, 14 and 16 respectively. For a round knee cushion 10 having a diameter of from between about 12 to about 18 inches, the depth d of each of the first leg depressions 22, 22 can range from between about 0.2 inches to about 0.75 inches. Desirably, for a round knee cushion 10 having a diameter of from between about 12 to about 18 inches, the depth d of each of the first leg depressions 22, 22 can range from between about 0.3 inches to about 0.7 inches. More desirably, for a round knee cushion 10 having a diameter of from between about 12 to about 18 inches, the depth d of each of the first leg depressions 22, 22 can range from between about 0.4 inches to about 0.6 inches. Most desirably, for a round knee cushion 10 having a diameter of from between about 12 to about 18 inches, the depth d of each of the first leg depressions 22, 22 can be about 0.5 inches or less.

Stated another way, the bottom surface 26 of the first and second leg depressions, 22, 22 and 24, 24 respectively, can be located at least about 0.5 inches below each of the first and second major surfaces, 14 and 16 respectively.

Still referring to FIGS. 1-6, each of the first leg depressions 22, 22 has one or more raised areas 28 formed on the bottom surface 26. The raised areas 28 can vary in number, shape, height, design, and arrangement. The raised areas 28 extend upward from the bottom surface 26 and function to reduce pressure points along the legs and knees. Three raised areas 28, 28 and 28 are depicted in FIGS. 1-6 in the shape of elongated ribs. Each raised area 28 has a height hi which is less than the depth d of each of the first leg depressions 22, 22. The height hi of each raised area 28 can range from between about 0.1 inch to about 0.4 inch, depending on the overall size of the knee cushion 10. For a round knee cushion 10 having a diameter of from between about 12 to about 18 inches, the height hi of each raised area 28 can range from between about 0.15 inches to about 0.35 inches. Desirably, for a round knee cushion 10 having a diameter of from between about 12 to about 18 inches, the height hi of each raised area 28 can range from between about 0.18 inches to about 0.33 inches. More desirably, for a round knee cushion 10 having a diameter of from between about 12 to about 18 inches, the height hi of each raised area 28 can range from between about 0.2 inches to about 0.3 inches. Most desirably, for a round knee cushion 10 having a diameter of from between about 12 to about 18 inches, the height hi of each raised area 28 can be about 0.25 inches or less. The one or more raised area 28 that are present function to provide increase air flow, provide better air circulation along at least a portion of the length of each of the first leg depressions 22, 22, and relieve leg pressure compared to a flat surface.

Figure 2:
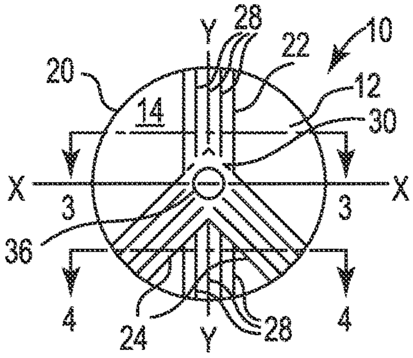
FIG. 2 is a top view of the knee cushion shown in FIG. 1.

Referring now to FIGS. 1 and 2, each of the second leg depressions 24, 24 has an inverted V-shape with an apex 30. By "inverted" it is meant to turn upside down. The apex 30 intersects each of the first leg depressions 22, 22 along the vertical central axis Y-Y, at a point located above the longitudinal central axis X-X. Each segment of the inverted V-shaped second leg depression 24, 24 can vary in configuration. Desirably, each segment of the inverted V-shaped second leg depression 24, 24 is linear. Each of the second leg depressions 24, 24 starts at a point on the outer periphery 20 and extends towards the center of the knee cushion 10. Each of the second leg depressions 24, 24 has a width $w_1$ and a depth $d_1$. The width $w_1$ and the depth $d_1$ of each of the second leg depressions 24, 24 can vary. The width $w_1$ of each of the second leg depressions 24, 24 can be identical to or be different from the width w of the first leg depressions 22, 22. Desirably, the width $w_1$ of each of the second leg depressions 24, 24 is identical to the width w of the first leg depressions 22, 22. The width $w_1$ of each of the second leg depressions 24, 24 can range from between about 2 inches to about 6 inches, depending on the overall size of the knee cushion 10. For a round knee cushion 10 having a diameter of from between about 12 to about 18 inches, the width $w_1$ of each of the second leg depressions 24, 24 can range from between about 2.5 inches to about 5.75 inches. Desirably, for a round knee cushion 10 having a diameter of from between about 12 to about 18 inches, the width $w_1$ of each of the second leg depressions 24, 24 can range from between about 2.75 inches to about 5.5 inches. More desirably, for a round knee cushion 10 having a diameter of from between about 12 to about 18 inches, the width $w_1$ of each of the second leg depressions 24, 24 can range from between about 3 inches to about 5 inches. Most desirably, for a round knee cushion 10 having a diameter of from between about 12 to about 18 inches, the width $w_1$ of each of the second leg depressions 24, 24 can be about 4 inches or less.

The depth $d_1$ of each of the second leg depressions 24, 24 can be identical to or be different from the depth d of the first leg depressions 22, 22. Desirably, the depth $d_1$ of each of the second leg depressions 24, 24 is identical to the depth d of the first leg depressions 22, 22. The depth $d_1$ of each of the second leg depressions 24, 24 can range from between about 0.1 inch to about 1 inch, depending on the overall size of the knee cushion 10. For a round knee cushion 10 having a diameter of from between about 12 to about 18 inches, the depth $d_1$ of each of the second leg depressions 24, 24 can range from between about 0.2 inches to about 0.75 inches. Desirably, for a round knee cushion 10 having a diameter of from between about 12 to about 18 inches, the depth $d_1$ of each of the second leg depressions 24, 24 can range from between about 0.3 inches to about 0.7 inches. More desirably, for a round knee cushion 10 having a diameter of from between about 12 to about 18 inches, the depth $d_1$ of each of the second leg depressions 24, 24 can range from between about 0.4 inches to about 0.6 inches. Most desirably, for a round knee cushion 10 having a diameter of from between about 12 to about 18 inches, the depth $d_1$ of each of the second leg depressions 24, 24 can be about 0.5 inches or less.

Figure 3:
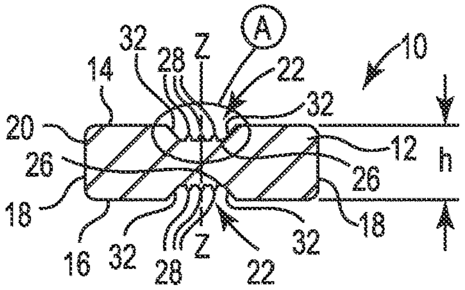
FIG. 3 is a cross-sectional view taken along line 3-3 of FIG. 2.
Figure 5:
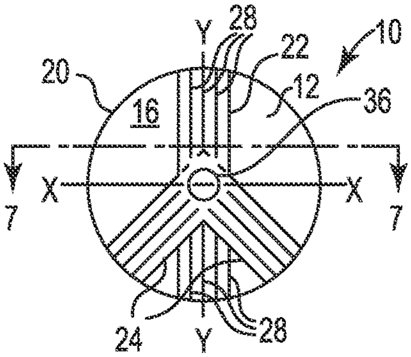
FIG. 5 is a bottom view of the knee cushion shown in FIG. 1.
Figure 6:
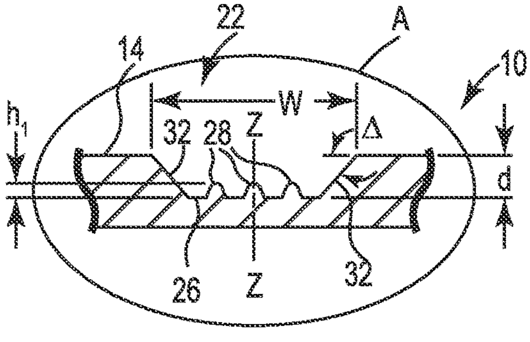
FIG. 6 is an exploded view "A" of the leg depression 22 shown in FIG. 3.

Referring now to FIGS. 3 and 6, each of the first leg depressions 22, 22 has sides 32, 32 which extend or taper down from the first major surface 14 toward the bottom surface 26, and from the second major surface 16 towards the bottom surface 26. The sides 32, 32 can be formed at an angle delta Δ, see FIG. 6. The angle delta Δ is the fourth letter of the Greek alphabet. The angle delta Δ can be an acute angle. By an "acute angle" it is meant an angle of less than 90 degrees. The angle delta Δ can range from between about 15 degrees to about 75 degrees. Desirably, the angle delta Δ can range from between about 20 degrees to about 65 degrees. More desirably, the angle delta Δ can range from between about 25 degrees to about 60 degrees. Even more desirably, the angle delta Δ can range from between about 30 degrees to about 55 degrees.

Most desirably, the angle delta Δ is about 30 degrees.

Figure 4:
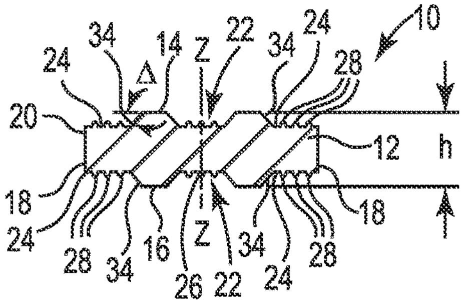
FIG. 4 is a cross-sectional view taken along line 4-4 of FIG. 2.

Referring to FIGS. 4, each of the second leg depressions 24, 24 has sides 34, 34 which extend or taper down from the first major surface 14 toward the bottom surface 26, and from the second major surface 16 toward the bottom surface 26. The sides 34, 34 can be formed at an angle delta Δ. The angle delta Δ can be an acute angle. By an "acute angle" it is meant an angle of less than 90 degrees. The angle delta Δ can range from between about 15 degrees to about 75 degrees. Desirably, the angle delta Δ can range from between about 20 degrees to about 65 degrees. More desirably, the angle delta Δ can range from between about 25 degrees to about 60 degrees. Even more desirably, the angle delta Δ can range from between about 30 degrees to about 55 degrees. Most desirably, the angle delta Δ is about 30 degrees or less.

It should be understood that each of the first and second leg depressions, 22, 22 and 24, 24 respectively, can be formed identical to one another. This means that the width w will be equal to the width $w_1$, the depth d will be equal to the depth $d_1$, and the sides 32, 32 and 34, 34 will all be formed at a similar angle delta Δ.

The first and second leg depressions, 22, 22 and 24, 24 respectively, permit a person to position the knee cushion 10 between their knees and to orient their legs in at least two different positions, while resting or sleeping on their side. The knee cushion 10 will assist in aligning a person's hips, will keep their spine straight, will reduce pressure points, will prevent their knee bones from touching, and will provide room for a man's testicles, so that the person can obtain a more relaxing rest or sleep. For example, a person can keep his or her legs straight and position them in the first leg depressions 22, 22 which are formed in the first and second major surfaces, 14 and 16 respectively. Alternatively, a person can bend his or her legs and position them in the second leg depressions 24, 24 which are formed in the first and second major surfaces, 14 and 16 respectively. Another alternative is to place the knee cushion 10 on the bed sheet and position one knee on the first major surface 14. In this case, one leg is elevated relative to the other leg. Some people find this position to be very comfortable. Still another option is for the person to rotate the knee cushion 10 and use the second leg depressions 24, 24 where both legs are bent at 90 degrees. A further option is for a person to bend one leg at 90 degrees and the other leg at 45 degrees. FIGS. 20 to 25, which appear later, describe six different leg positions which can be accommodated by the knee cushion 10.

Referring again to FIGS. 1, 2 and 5, the knee cushion 10 further includes a circular depression 36 located, in a central portion of the modified peace symbol, on both the first and second major surfaces, 14 and 16 respectively. Each of the circular depressions 36, 36 is located at the center of the knee cushion 10 when the knee cushion 10 has a round or circular configuration. If the knee cushion 10 does not have a round or circular configuration, the circular depressions 36, 36 can be located in a central portion of the knee cushion 10. The size of the circular depressions 36, 36 can vary depending on the overall size of the knee cushion 10. For a round knee cushion 10 having a diameter of from between about 12 to about 18 inches, each of the circular depressions 36, 36 will have a diameter that is greater than about 1 inch. Desirably, for a round knee cushion 10 having a diameter of from between about 12 to about 18 inches, each of the circular depressions 36, 36 will have a diameter which ranges from between about 1.5 inches to about 3.5 inches. More desirably, for a round knee cushion 10 having a diameter of from between about 12 to about 18 inches, each of the circular depressions 36, 36 will have a diameter which ranges from between about 1.75 inches to about 3 inches. Still more desirably, for a round knee cushion 10 having a diameter of from between about 12 to about 18 inches, each of the circular depressions 36, 36 will have a diameter which ranges from between about 2 inches to about 3 inches. Most desirably, for a round knee cushion 10 having a diameter of from between about 12 to about 18 inches, each of the circular depressions 36, 36 will have a diameter of about 2.5 inches or less.

Figure 7:
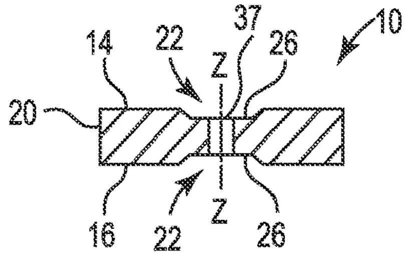
FIG. 7 is a cross-sectional view taken along line 7-7 of FIG. 5 and showing a through hole 37.

Referring to FIG. 7, the two circular depressions 36, 36 can be replaced by a through hole 37. The through hole 37 will extend from the bottom surface 26 of the first leg depression 22, formed in the first major surface 14, to the bottom surface 26 of the first leg depression 22, formed in the second major surface 16. The diameter of the through hole 37 can vary as well as the geometrical configuration of the through hole 37. The diameter of the through hole 37 can range from between about 1 inch to about 3.5 inches. Desirably, the diameter of the through hole 37 is greater than about 1.5 inches. More desirably, the diameter of the through hole 37 is greater than about 2 inches. The shape of the through hole 17 can be round, square, rectangular, oval, a polygon, or any other shape known to one skilled in the art.

Figure 8:
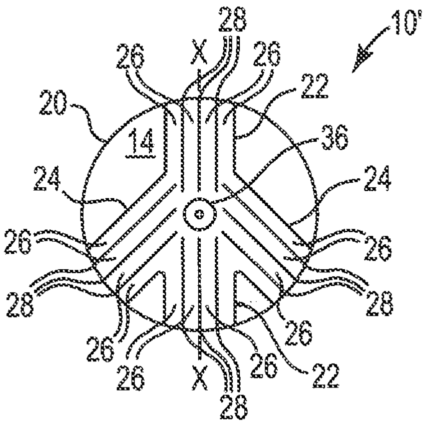
FIG. 8 is a top view of another embodiment of the knee cushion showing ribs 28 formed in the first and second leg depressions 22 and 24.

Referring now to FIG. 8, an alternative embodiment of a knee cushion 10' is shown having a round profile and each of the first and second leg depressions, 22, 22 and 24, 24 respectively, having three raised areas 28, 28, 28. The raised areas 28, 28 and 28 are configured as three elongated ribs. All three ribs 28, 28 and 28 are formed on the bottom surface 26 of the first leg depression 22. All three ribs 28, 28 and 28 stop short of the circular depression 36.

The three ribs 28, 28 and 28, formed on the bottom surface 26 of the second leg depression 24, extend the entire length of the second leg depression 24. The raised areas 28" allow for increased air flow and greater air circulation. This is important for it allows a person to position his or her legs in the first and second leg depressions 22, 22 and 24, 24 respectively, while the knee cushion 10" remains cool to the touch. Air flow prevents the knee cushion 10" from becoming warm and uncomfortable during use. The raised areas 28, 28 and 28 also relieve leg pressure compared to a flat surface. This allows the knee cushion 10 to be used for longer time periods.

Figure 9:
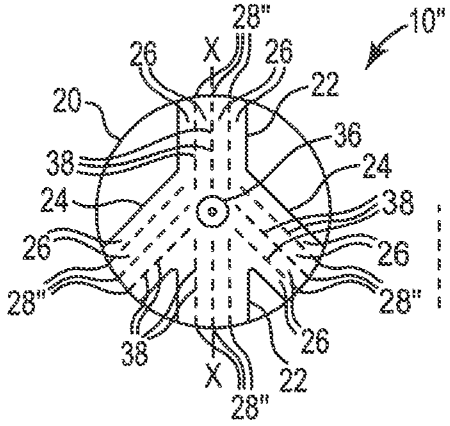
FIG. 9 is a top view of still another embodiment of the knee cushion showing ribs 28 formed by a plurality of dashes.

Referring now to FIG. 9, another embodiment of a knee cushion 10" is shown having a round profile and each of the first and second leg depressions, 22, 22 and 24, 24 respectively, having three raised areas 28", 28" and 28". The raised areas 28", 28" and 28" are configured as elongated ribs containing a plurality of dashes. All three ribs 28", 28" and 28" are formed on the bottom surface 26 of the first leg depression 22. All three ribs 28", 28", and 28" stop short of the circular depression 36.

The three ribs 28", 28" and 28", formed on the bottom surface 26 of the second leg depression 24, extend the entire length of the second leg depression 24. Each raised area 28" is formed from a plurality of dashes 38. The dashes 38 can be evenly spaced apart, as shown, or they can be randomly spaced apart, if desired. The raised areas 28" allow for increased air flow and greater air circulation. This is important for it allows a person to position his or her legs in the first and second leg depressions 22, 22 and 24, 24 respectively, while the knee cushion 10" remains cool to the touch. Air flow prevents the knee cushion 10" from becoming warm and uncomfortable during use. The raised areas 28, 28 and 28 also relieve leg pressure compared to a flat surface. This allows the knee cushion 10 to be used for longer time periods.

Figure 10:
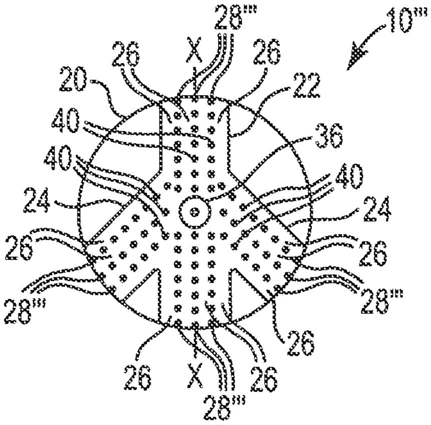
FIG. 10 is a top view of still another embodiment of the knee cushion showing ribs 28 formed by a plurality of uniformly arranged dots.

Referring now to FIG. 10, still another embodiment of a knee cushion 10'" is shown having a round profile and each of the first and second leg depressions, 22, 22 and 24, 24 respectively, having three raised areas 28'". The raised areas 28", 28" and 28" are configured as elongated ribs formed from a plurality of dots 40. All three raised areas or ribs 28'",

28''' and 28''' are formed on the bottom surface 26 of the first leg depression 22. All three raised areas or ribs 28''', 28''' and 28''' stop short of the circular depression 36.

The three ribs 28''', 28''' and 28''' are formed on the bottom surface 26 of the second leg depression 24 and extend the entire length of the second leg depression 24. The three raised areas or ribs 28''', 28''' and 28''' are formed from a plurality of dots 40. The dots 40 can be evenly spaced apart, as shown, or they can be randomly spaced apart, if desired. The dots 40 can vary in size, height and configurations. The dots 40 can be round or circular. The dots 40 can be raised bumps or be holes extending below the bottom surface 26. Desirably, the dots 40 are raised areas having a diameter of from between about 0.1 inches to about 0.4 inches. More desirably, the dots 40 are raised areas having a diameter of from between about 0.1 inches to about 0.35 inches. Even more desirably, the dots 40 are raised areas having a diameter of from between about 0.1 inches to about 0.3 inches. Most desirably, the dots 40 are raised areas having a diameter of about 0.29 inches or less. The raised areas 28''' allow for increased air flow and greater air circulation. This is important for it allows a person to position his or her legs in the first and second leg depressions 22, 22 and 24, 24 respectively, while the knee cushion 10''' remains cool to the touch. Air flow prevents the knee cushion 10''' from becoming warm and uncomfortable during use. The raised areas 28, 28 and 28 also relieve leg pressure compared to a flat surface. This allows the knee cushion 10 to be used for longer time periods.

Figure 11:
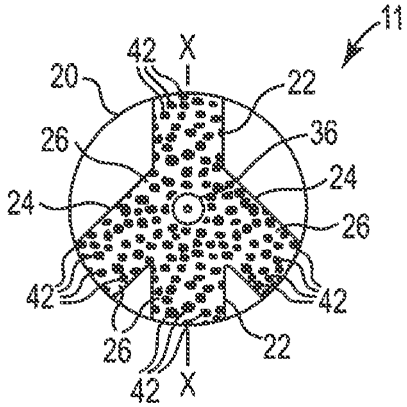
FIG. 11 is a top view of still another embodiment of the knee cushion showing ribs 28 formed by a plurality of randomly arranged dots.

Referring now to FIG. 11, still another embodiment of a knee cushion 11 is shown having a round profile and each of the first and second leg depressions, 22, 22 and 24, 24 respectively, having a random arrangement of raised areas 42, in the form of bumps. The raised areas 42 extend over the entire surface area of the first and second leg depressions 22, 22 and 24, 24 respectively. The raised areas or bumps 42 extend upward from the bottom surface 26. The bumps 42 can vary in size, height and configurations. The raised areas or bumps 42 can be round or circular. Desirably, the bumps 42 are raised areas having a diameter of from between about 0.1 inches to about 0.4 inches. More desirably, the bumps 42 are raised areas having a diameter of from between about 0.1 inches to about 0.35 inches. Even more desirably, the bumps 42 are raised areas having a diameter of from between about 0.1 inches to about 0.3 inches. Most desirably, the bumps 42 are raised areas having a diameter of about 0.29 inches or less. The bumps 42 allow for greater air flow and greater air circulation. This is important for it allows a person to position his or her legs in the first and second leg depressions 22, 22 and 24, 24 respectively, while the knee cushion 11 remains cool to the touch. Air flow prevents the knee cushion 11 from becoming warm and uncomfortable during use. The bumps 42 also relieve leg pressure compared to a flat surface. This allows the knee cushion 10 to be used for longer time periods.

Figure 12:
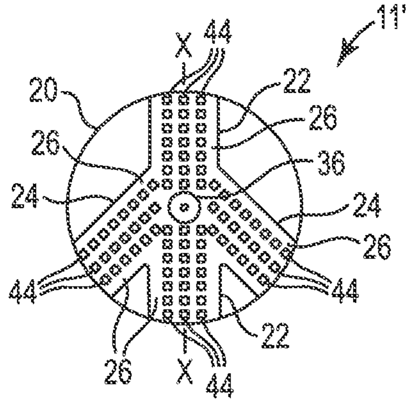
FIG. 12 is a top view of still another embodiment of the knee cushion showing ribs 28 formed by a plurality of squares and rectangles.

Referring now to FIG. 12, still another embodiment of a knee cushion 11' is shown having a round profile and each of the first and second leg depressions, 22, 22 and 24, 24 respectively, having a pattern arrangement of raised areas 44 in the form of squares or rectangles. The raised areas 44 can form two or more rows, three rows are shown, extending along the first and second leg depressions 22, 22 and 24, 24 respectively. The raised areas 44 can be uniformly or randomly arranged. One can use raised areas 44 which are all squares, all rectangles, or a combination of both. The raised areas 44 extend upward from the bottom surface 26. The raised areas 44 can vary in size, height and configurations. The raised areas 44 can be solid or hollow. Desirably, each of the raised areas 44 has a dimension of from between about 0.1 inches to about 0.5 inches. More desirably, each of the raised areas 44 has a dimension of from between about 0.1 inches to about 0.4 inches. Even more desirably, each of the raised areas 44 has a dimension of from between about 0.1 inches to about 0.35 inches. Most desirably, each of the raised areas 44 has a dimension of about 0.3 inches or less. The raised areas 44 allow for greater air flow and greater air circulation. This is important for it allows a person to position his or her legs in the first and second leg depressions 22, 22 and 24, 24 respectively, while the knee cushion 11 remains cool to the touch. Air flow prevents the knee cushion 11 from becoming warm and uncomfortable during use. The raised areas 44 also relieve leg pressure compared to a flat surface. This allows the knee cushion 10 to be used for longer time periods.

Figure 13:
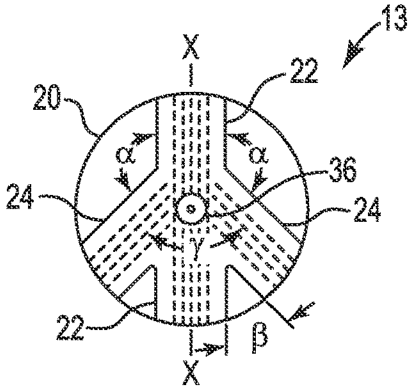
FIG. 13 is a top view of another embodiment of a knee cushion showing a second V-shaped leg depression intersecting with a first linear leg depression to form a peace symbol with an angle alpha ($\alpha$) of 135 degrees, an angle beta ($\beta$) of 45 degrees, and an angle gamma ($\gamma$) of 90 degrees.

Referring now to FIG. 13, another embodiment of a knee cushion 13 is shown having an angle alpha α formed between the first leg depression 22 and the right side of the second leg depression 24. An angle alpha α is also formed between the first leg depression 22 and the left side of the second leg depression 24. Alpha α is the first letter of the Greek alphabet. In this embodiment, the angle alpha a is an obtuse angle of 135 degrees. By "obtuse" it is meant an angle between 90 degrees and 180 degrees.

An angle beta β is formed between the lower portion of the first leg depression 22 and the lower side of the second right leg depression 24. An angle beta β is also formed between the first leg depression 22 and the lower side of the second left leg depression 24. Beta β is the second letter of the Greek alphabet. In this embodiment, the angle beta β is an acute angle of 45 degrees. By "acute" it is meant an angle of less than 90 degrees. The inverted V-shape of the second leg depression 24 has an inside angle gamma γ. Gamma γ is the third letter of the Greek alphabet. In this embodiment, the angle gamma γ is a right angle of 90 degrees.

Figure 14:
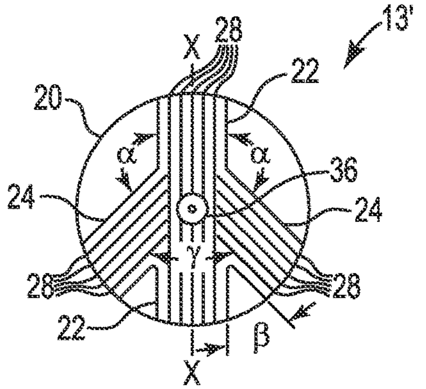
FIG. 14 is a top view of still another embodiment of a knee cushion showing a second V-shaped leg depression intersecting with a first linear leg depression to form a peace symbol with an angle alpha ($\alpha$) of 125 degrees, an angle beta ($\beta$) of 55 degrees, and an angle gamma ($\gamma$) of 110 degrees.

Referring now to FIG. 14, still another embodiment of a knee cushion 13' is shown having an angle alpha α formed between the first leg depression 22 and the right side of the second leg depression 24. An angle alpha α is also formed between the first leg depression 22 and the left side of the second leg depression 24. In this embodiment, the angle alpha α is an obtuse angle of 125 degrees. An angle beta β is formed between the lower portion of the first leg depression 22 and the lower side of the second right leg depression 24. An angle beta β is also formed between the first leg depression 22 and the lower side of the second left leg depression 24. In this embodiment, the angle beta β is an acute angle of 55 degrees. The inverted V-shape of the second leg depression 24 has an inside angle gamma γ. In this embodiment, the angle gamma γ is an obtuse angle of 110 degrees.

FIG. 14 also shows five (5) raised areas 28 configured as elongated ribs formed in the first and second leg depressions, 22 and 24 respectively. One can vary the number of raised areas 28 and the size, height and configuration of each raised area 28 to adjust for increased air flow and better air circulation. The raised areas 28 also relieve leg pressure compared to a flat surface. This allows the knee cushion 10 to be used for longer time periods.

Figure 15:
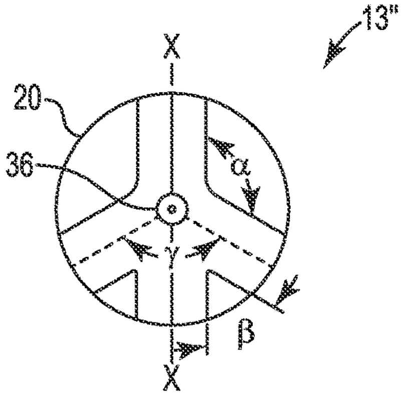
FIG. 15 is a top view of still another embodiment of a knee cushion showing a second V-shaped leg depression intersecting with a first linear leg depression to form a peace symbol with an angle alpha ($\alpha$) of 110 degrees, an angle beta ($\beta$) of 70 degrees, and an angle gamma ($\gamma$) of 140 degrees.

Referring now to FIG. 15, still another embodiment of a knee cushion 13" is shown having an angle alpha α formed between the first leg depression 22 and the right side of the second leg depression 24. An angle alpha α is also formed between the first leg depression 22 and the left side of the second leg depression 24. In this embodiment, the angle alpha α is an obtuse angle of about 110 degrees. An angle beta β is formed between the lower portion of the first leg depression 22 and the lower side of the second right leg depression 24. An angle beta β is also formed between the first leg depression 22 and the lower side of the second left leg depression 24. In this embodiment, the angle beta β is an acute angle of about 70 degrees. The inverted V-shape of the second leg depression 24 has an inside angle gamma γ. In this embodiment, the angle gamma γ is an obtuse angle of about 140 degrees.

Figure 16:
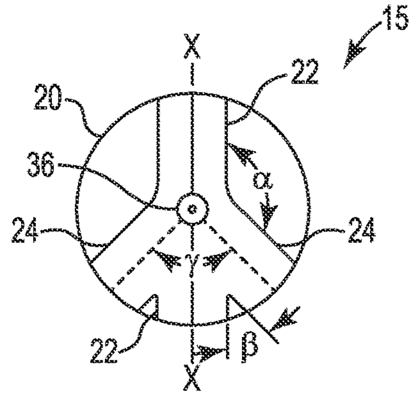
FIG. 16 is a top view of still another embodiment of a knee cushion showing a second V-shaped leg depression intersecting with a first linear leg depression to form a peace symbol with an angle alpha ($\alpha$) of 140 degrees, an angle beta ($\beta$) of 40 degrees, and an angle gamma ($\gamma$) of 80 degrees.

Referring now to FIG. 16, still another embodiment of a knee cushion 15 is shown having an angle alpha α formed between the first leg depression 22 and the right side of the second leg depression 24. An angle alpha α is also formed between the first leg depression 22 and the left side of the second leg depression 24. In this embodiment, the angle alpha α is an obtuse angle of about 140 degrees. An angle beta β is formed between the lower portion of the first leg depression 22 and the lower side of the second right leg depression 24. An angle beta β is also formed between the first leg depression 22 and the lower side of the second left leg depression 24. In this embodiment, the angle beta β is an acute angle of about 40 degrees. The inverted V-shape of the second leg depression 24 has an inside angle gamma γ. In this embodiment, the angle gamma γ is an obtuse angle of about 80 degrees.

Figure 17:
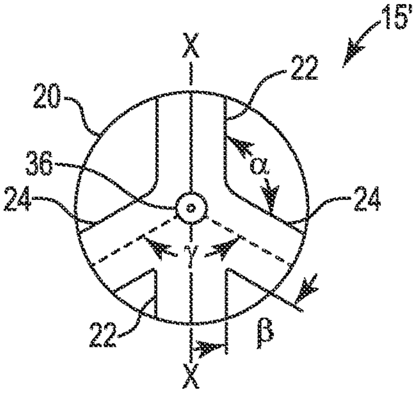
FIG. 17 is a top view of still another embodiment of a knee cushion showing a second V-shaped leg depression intersecting with a first linear leg depression to form a peace symbol with an angle alpha ($\alpha$) of 115 degrees, an angle beta ($\beta$) of 65 degrees, and an angle gamma ($\gamma$) of 130 degrees.

Referring now to FIG. 17, still another embodiment of a knee cushion 15' is shown having an angle alpha α formed between the first leg depression 22 and the right side of the second leg depression 24. An angle alpha α is also formed between the first leg depression 22 and the left side of the second leg depression 24. In this embodiment, the angle alpha α is an obtuse angle of about 115 degrees. An angle beta β is formed between the lower portion of the first leg depression 22 and the lower side of the second right leg depression 24. An angle beta β is also formed between the first leg depression 22 and the lower side of the second left leg depression 24. In this embodiment, the angle beta β is an acute angle of about 65 degrees. The inverted V-shape of the second leg depression 24 has an inside angle gamma γ. In this embodiment, the angle gamma 7 is an obtuse angle of about 130 degrees.

Figure 18:
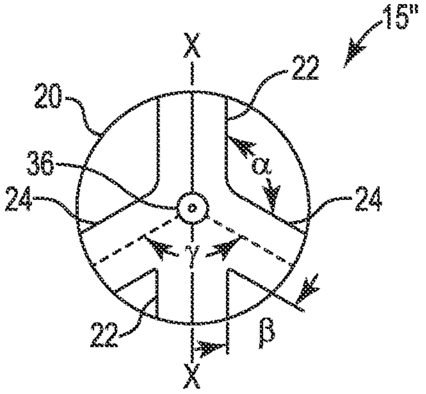
FIG. 18 is a top view of still another embodiment of a knee cushion showing a second V-shaped leg depression intersecting with a first linear leg depression to form a peace symbol with an angle alpha ($\alpha$) of 120 degrees, an angle beta ($\beta$) of 60 degrees, and an angle gamma ($\gamma$) of 120 degrees.

Referring now to FIG. 18, still another embodiment of a knee cushion 15" is shown having an angle alpha α formed between the first leg depression 22 and the right side of the second leg depression 24. An angle alpha α is also formed between the first leg depression 22 and the left side of the second leg depression 24. In this embodiment, the angle alpha α is an obtuse angle of about 120 degrees. An angle beta β is formed between the lower portion of the first leg depression 22 and the lower side of the second right leg depression 24. An angle beta β is also formed between the first leg depression 22 and the lower side of the second left leg depression 24. In this embodiment, the angle beta β is an acute angle of about 60 degrees. The inverted V-shape of the second leg depression 24 has an inside angle gamma 7. In this embodiment, the angle gamma γ is an obtuse angle of about 120 degrees.

It should be understood from viewing FIGS. 13-18, that the angle alpha α can vary from between about 110 degrees to about 140 degrees: the angle beta β can vary from between about 40 degrees to about 70 degrees; and the angle gamma γ can vary from between about 80 degrees to about 140 degrees.

Returning again to FIGS. 1-6, the knee cushion 10 is formed from an integral foam member 12 which has an Indentation Force Deflection (IFD) at 25% of from between about 8 pounds-force to about 18 pounds-force. When the knee cushion 10 has a round or circular profile, it can have a diameter ranging from between about 6 inches to about 18 inches. The at least one sidewall 18 of the knee cushion 10 can have a height h of from between about 2 inches to about 6 inches. In addition, the integral foam member 12 can have an Indentation Force Deflection (IFD) at 65% of from between about 30 pounds-force to about 40 pounds-force.

Figure 19:
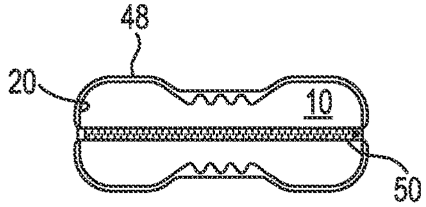
FIG. 19 is an end view of the knee cushion shown in FIG. 2 enclosed by a cover.

Referring now to FIG. 19, a knee cushion 10 is shown enclosed by a cover 48. The cover 48 can be constructed from a variety of materials. The cover 48 could be made of from a natural or a synthetic material. By "synthetic" it is meant produced by synthesis, not of a natural origin. The cover 48 can be made from: linen, rayon, nylon, polyester, cotton, flannel, microfibers, *Eucalyptus* Lyocell, bamboo, Egyptian cotton, a combination of two or more materials, or from some other material known to one skilled in the art. The cover 48 functions like a pillowcase and is meant to keep the knee cushion 10 clean and dry. The cover 48 should be easily removable from the knee cushion 10 so that it can be cleaned. The cover 48 can be hand washable, machine washable or be professionally dry cleaned. The cover 48 contains a closing mechanism 50, such as a draw string, a zipper, tie strings, mechanical snaps, buttons and button holes, VELCRO® hook and loop fasteners, or some other kind of closing mechanism known to one skilled in the art. Alternatively, the cover 48 could be tucked or folded upon itself to fully enclose the knee cushion 10.

The cover 48 can be constructed from a fabric having a specific thread count. For example, the cover 48 could be constructed from a fabric having a thread count of from between about 500 to about 1,000 threads per square inch.

The cover 48 could be resilient. By "resilient" it is meant that it is able to recover. Furthermore, the cover 48 could be elastic or stretchable so that it will snugly fit over the knee cushion 10. For example, the cover 48 could be form fitted over the knee cushion 10 so that it will stay in place and move very little relative to the knee cushion 10. Desirably, the fabric used to form the cover 48 is stretchable to allow a person's knees and a portion of his or her legs to sink down into the first and second leg depressions 22, 22 and 24, 24 respectively, of the knee cushion 10.

The cover 48 should have a coefficient of friction (COF) which is less than that of the knee cushion 10. This will enable a person's knees and a portion of his or her legs to slide easily on the cover 48. In addition, the higher coefficient of friction (COF) of the knee cushion 10 will allow it to remain stationary within the cover 48.

The cover 48 can also be shaped, sized, configured, and/or be sewn to fit the first and second leg depressions, 22, 22 and 24, 24 respectively, of the knee cushion 10. The cover 48 can vary in color and design. The cover 48 can be died or colored to exhibit a single color or be made with two or more colors. For example, the cover 48 can be formed to have a single color, have two or more colors, be multi-colored, etc. The cover 48 can have some kind of design, image or pattern printed on it, if desired. The cover 48 can also be printed with letters, words, numbers, symbols, images, etc. For example, the cover 48 could also be printed with the words: "KNEES PEACE", "KNEE CUSHION", "KNEE PILLOW", "PEACE CUSHION", etc. Such words can also be molded into the knee cushion 10 itself during its construction. Lastly, the cover 48 could have the modified "peace sign" printed on it.

Method of Using

The knee cushion 10, 10', 10", 11, 11', 11", 13, 13' or 13" can be used by a person resting or sleeping on his or her side.

The knee cushion 10, 10', 10", 11, 11', 11", 13, 13' or 13" can be placed or positioned between the person knees. His or her knees can be straight wherein the first leg depressions 22, 22 are utilized. Alternatively, the person can bend his or her knees wherein the second leg depressions 24, 24 will be utilized. The knee cushion 10, 10', 10", 11, 11', 11", 13, 13' or 13" can be used with a cover 48 or without a cover 48. Desirably, the knee cushion 10, 10', 10", 11, 11', 11", 13, 13' or 13" is enclosed by a removable cover 48. The knee cushion 10, 10', 10", 11, 11', 11", 13, 13' or 13" is washable, either by hand or in a washing machine.

Another option is for a person to place the knee cushion 10, 10', 10", 11, 11', 11", 13, 13' or 13" on the outer sheet of a bed or couch. The person can then lie on his or her side and position one of his or her knees on the knee cushion 10, 10', 10", 11, 11', 11", 13, 13' or 13". The person's knee can be aligned with the circular depression 36. A portion of the person's leg will match up with either the first or second leg depression, 22 or 24 respectively. The person can bend his or her leg or keep it straight. The knee cushion 10, 10', 10", 11, 11', 11", 13, 13' or 13" will cause the leg resting on it to be raised and this can remove pressure from the person's hips. By elevating one leg, the person may be able to rest or sleep more comfortably.

Figure 20:
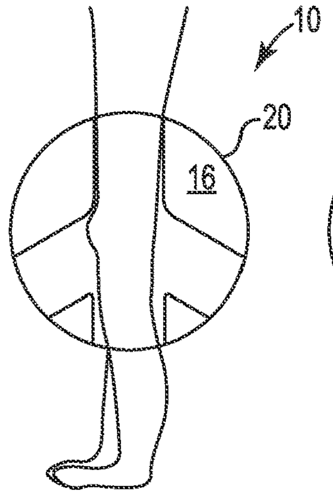
FIG. 20 shows the knee cushion positioned between a person's knees and both legs are straight.

Referring now to FIGS. 20 to 25, several different positions are shown of a person's legs and knees relative to the knee cushion 10. In FIG. 20, the knee cushion 10 is positioned between a person's knees and both of the person's legs are straight. Each of the person's legs will be aligned with one of the first leg depressions 22, 22 formed on the first and second major surfaces, 14 and 16 respectively.

Figure 21:
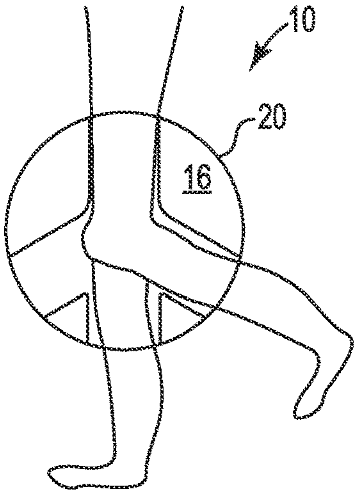
FIG. 21 shows the knee cushion positioned between a person's knees and one leg is straight and the other leg is bent.

FIG. 21 the knee cushion 10 is positioned between a person's knees and shows one leg of a person is bent and the other leg is straight. The bent leg will be aligned with half of the first leg depression 22 formed in the second leg depression 16, and with half of the V-shaped second leg depression 24 on the second major surface 16. The bent leg could be at an angle ranging from between about 110 degrees to about 140 degrees, for example, about 135 degrees. The other leg (the straight leg) will be aligned with the first leg depression 22 formed in the first major surface 14.

Figure 22:
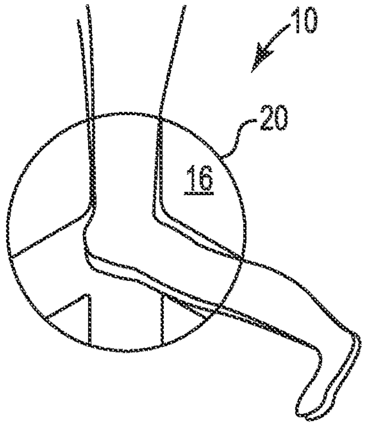
FIG. 22 shows the knee cushion positioned between a person's knees and both legs are bent at about 135 degrees.

FIG. 22 shows the knee cushion 10 positioned between a person's knees and both legs are bent at an angle. The angle can vary. For example, the angle can be about 115 degrees. The upper portion of each leg is aligned in the first leg depressions 22, 22 and the lower portion of each leg (below the knee) is aligned with half of the V-shaped second leg depression 24 on the first and second major surfaces, 14 and 16 respectively.

Figure 23:
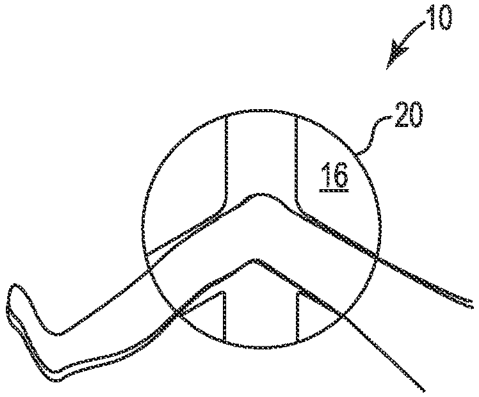
FIG. 23 shows the knee cushion positioned between a person's knees and both legs are bent at about 90 degrees.

FIG. 23 shows the knee cushion 10 positioned between a person's knees and both legs are bent at an angle. The angle can vary. For example, the angle can be about 115 degrees. Both legs are aligned in the V-shaped second leg depressions 24, 24 formed in the first and second major surfaces 14 and 16.

Figure 24:
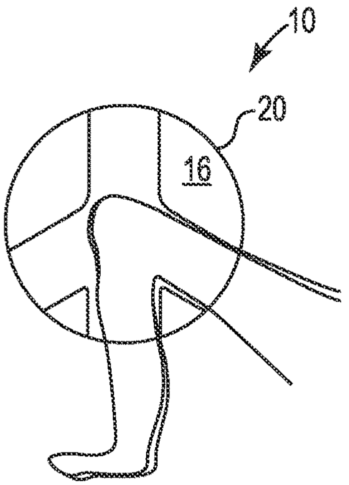
FIG. 24 shows the knee cushion positioned between a person's knees and both legs are bent at about 45 degrees.

FIG. 24 shows the knee cushion 10 positioned between a person's knees and both legs are bent at an angle. The angle can vary. For example, the legs can be bent at about 45 degrees. The upper portion of each leg is aligned with one of the V-shaped second leg depressions 24, 24 formed in the first and second major surfaces, 14 and 16 respectively, and the lower portions of each leg are aligned with half of the first leg depressions 22, 22 formed in the first and second major surfaces, 14 and 16 respectively.

Figure 25:
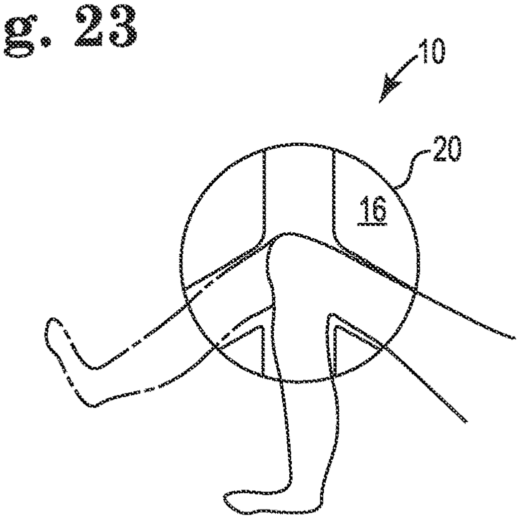
FIG. 25 shows the knee cushion positioned between a person's knees and one leg is bent at about a 45 degree angle, and the other leg is bent at about 90 degrees.

FIG. 25 shows the knee cushion 10 positioned between a person's knees and one leg is bent at an angle of about 45 degrees, and the other leg is bent at an angle of about 90 degrees. The upper portion of the leg bent at about 45 degrees is aligned with half of the V-shaped second leg depression 24 formed on the second major surface 16, and the lower portion of this same leg is aligned with half of the first leg depression 22 formed on the second major surface 16. The upper portion of the leg bent at about 90 degrees is aligned with half of the V-shaped second leg depression 24 formed on the first major surface 14, and the lower portion of this same leg is aligned with the other half of the second leg depression 24 formed on the first major surface 14.

The knee cushion 10 is unique in that at least two different leg positions of a person can be accommodated. In FIGS. 20-25, the knees of a person are aligned with the circular depressions 36, 36 formed on the first and second major surfaces, 14 and 16 respectively.

Method of Forming

The method of forming the knee cushion 10, 10', 10", 11, 11', 11", 13, 13' or 13" includes placing an expandible foam composition in a mold. The interior surfaces of the mold are formed to a desired shape and configuration of the finished knee cushion 10, 10', 10", 11, 11', 11", 13, 13' or 13". The mold can be a two-piece mold. The foam composition can expand and take the shape of the interior surface of the mold. Once the foam has expanded to fill the mold, the mold can be opened and the formed knee cushion 10, 10', 10", 11, 11', 11", 13, 13' or 13" is removed. Any excess material present on the knee cushion 10, 10', 10", 11, 11', 11", 13, 13' or 13" can be cut or ground off. The interior surface of the mold can be cleaned so that it is ready to form another knee cushion 10, 10', 10", 11, 11', 11", 13, 13' or 13". The knee cushion 10, 10', 10", 11, 11', 11", 13, 13' or 13" can then be enclosed in a cover 48 or can be sold without the cover 48. The cover 48 functions like a pillowcase. The cover 48 is removable from the knee cushion 10, 10', 10", 11, 11', 11", 13, 13' or 13" and is washable.

A specific method involves using a polyurethane foam, a polyurethane memory foam, a polyurethane antimicrobial foam, a polyethylene foam, a polyethylene memory foam or a polyethylene antimicrobial foam. A preferred foam is an ECOFLEX® brand of polyurethane foam called ECOMATE®. This foam is a lightweight memory foam with a recovery time of from between about 2 seconds to about 4 seconds. This foam is formed by mixing 2.17 to 1 ratio of polymer to isocyanates. The composition is mixed for about 13 to about 15 seconds at a temperature of about 80° F. (Fahrenheit). This composition is then poured or injected into a two-piece mold. The mold can be constructed of silicon rubber, aluminum, cast iron, steel or any other material known to one skilled in the art. The composition is heated to about 80° F. (Fahrenheit) and after about 7 to 8 minutes, the foam can be removed and be allowed to cool back down to room temperature.

It should be understood that the knee cushion 10, 10', 10", 11, 11', 11", 13, 13' or 13" could also be formed using a 3D printer.

While the invention has been described in conjunction with several embodiments, it is to be understood that many alternatives, modifications, and variations will be apparent to those skilled in the art in light of the foregoing description. Accordingly, this invention is intended to embrace all such alternatives, modifications and variations which fall within the spirit and scope of the appended claims.

I claim:

1. A knee cushion suitable for use between a user's legs while sleeping or resting, the knee cushion comprising:

an integral foam member having a first major surface, an opposite-facing second major surface, an outer periphery, and a side wall joining the first major surface to the second major surface;

the first major surface having a first upper surface, a first depressed surface, and first tapered side surfaces connecting the first upper surface to the first depressed surface, the first major surface also having a first circular depression formed in a central portion of the knee cushion; and the second major surface having a second upper surface, a second depressed surface, and second tapered side surfaces connecting the second upper surface to the second depressed surface, the second major surface also having a second circular depression formed in the central portion of the knee cushion;

wherein the first depressed surface has first raised areas formed therein, and the second depressed surface has second raised areas formed therein;

wherein the first and second circular depressions are configured to align with the user's knees; and wherein the first tapered side surfaces are oriented along a first V-shape and the second tapered side surfaces are oriented along a second V-shape.

2. The knee cushion of claim 1, wherein the integral foam member has an Indentation Force Deflection at 25% in a range from 8 pounds-force to 18 pounds-force.

3. The knee cushion of claim 1, wherein the first depressed surface includes two first leg depressions that intersect to form the first V-shape, and the second depressed surface includes two second leg depressions that intersect to form the second V-shape.

4. The knee cushion of claim 1, wherein the first tapered side surfaces are tapered at an angle delta relative to the first upper surface, and where delta is in a range from 15 to 75 degrees.

5. The knee cushion of claim 1, wherein the first V-shape defines a first inside angel that is in a range from 80 degrees to 140 degrees.

6. The knee cushion of claim 1, wherein the first raised areas include circular raised areas.

7. The knee cushion of claim 1, wherein the first raised areas include square or rectangular raised areas.

8. The knee cushion of claim 1, wherein the first raised areas include raised elongate ribs.

9. The knee cushion of claim 1, wherein the outer periphery of the integral foam member is substantially circular, with a diameter in a range from 6 inches to 18 inches.

10. The knee cushion of claim 1, wherein the first depressed surface is defined by a plurality of intersecting leg depressions.

11. The knee cushion of claim 10, wherein the plurality of intersecting leg depressions form a modified peace symbol.

12. The knee cushion of claim 1, wherein the integral foam member comprises polyurethane.

13. A knee cushion, comprising:

an integral foam member having a first major surface, an opposite-facing second major surface, an outer periphery, and a side wall joining the first major surface to the second major surface;

the first major surface having a first upper surface, a first depressed surface, and first tapered side surfaces connecting the first upper surface to the first depressed surface; and the second major surface having a second upper surface, a second depressed surface, and second tapered side surfaces connecting the second upper surface to the second depressed surface;

wherein the first depressed surface has first raised areas formed therein, and the second depressed surface has second raised areas formed therein;

wherein the integral foam member has a through hole extending from the first major surface to the second major surface, opposed ends of the through hole being configured to align with a user's knees; and wherein the first tapered side surfaces are oriented along a first V-shape, and the second tapered side surfaces are oriented along a second V-shape.

14. The knee cushion of claim 13, wherein the integral foam member has an Indentation Force Deflection at 25% in a range from 8 pounds-force to 18 pounds-force.

15. The knee cushion of claim 13, wherein the first depressed surface includes two first leg depressions that intersect to form the first V-shape, and the second depressed surface includes two second leg depressions that intersect to form the second V-shape.

16. The knee cushion of claim 13, wherein the first tapered side surfaces are tapered at an angle delta relative to the first upper surface, and where delta is in a range from 15 to 75 degrees.

17. The knee cushion of claim 13, wherein the first V-shape defines a first inside angel that is in a range from 80 degrees to 140 degrees.

18. The knee cushion of claim 13, wherein the outer periphery of the integral foam member is substantially circular, with a diameter in a range from 6 inches to 18 inches.

19. The knee cushion of claim 1, wherein the first depressed surface is defined by a plurality of intersecting leg depressions.

20. The knee cushion of claim 19, wherein the plurality of intersecting leg depressions form a modified peace symbol.

* * * * *